United States Patent [19]

LeCompte

[11] Patent Number: 4,595,258
[45] Date of Patent: Jun. 17, 1986

[54] SHUTTER FOR RADIATION SOURCE OF EXTENDED AREA

[75] Inventor: George W. LeCompte, Tucson, Ariz.

[73] Assignee: Hughes Aircraft Company, Los Angeles, Calif.

[21] Appl. No.: 514,212

[22] Filed: Jul. 6, 1983

[51] Int. Cl.[4] .......................... G02B 26/02; G03B 9/36
[52] U.S. Cl. ..................................... 350/272; 350/266; 354/245
[58] Field of Search ............... 350/266, 271, 272, 274; 354/245

[56] References Cited

U.S. PATENT DOCUMENTS 3,881,810  5/1975  Colao ................................. 350/266
3,963,326  6/1976  Buchert ............................. 350/266

Primary Examiner—John K. Corbin
Assistant Examiner—P. M. Dzierzynski
Attorney, Agent, or Firm—Charles D. Brown; A. W. Karambelas

[57] ABSTRACT

Shutter 30 produces a pulsed emission from a beacon. Hot plate 40 radiates upward through openings 67. Shutter plate 52 slides to open and close the view of the hot plate. Outer optical plate 38 has divergent and adjoining reflector openings 67 so that a large area source is seen when the shutter is open. Means are also provided for urging the shutter into close engagement with the outer optical plate so that while in the open position the shutter plate is cooled so as not to become a radiator of energy when it is moved to the closed position.

1 Claim, 4 Drawing Figures

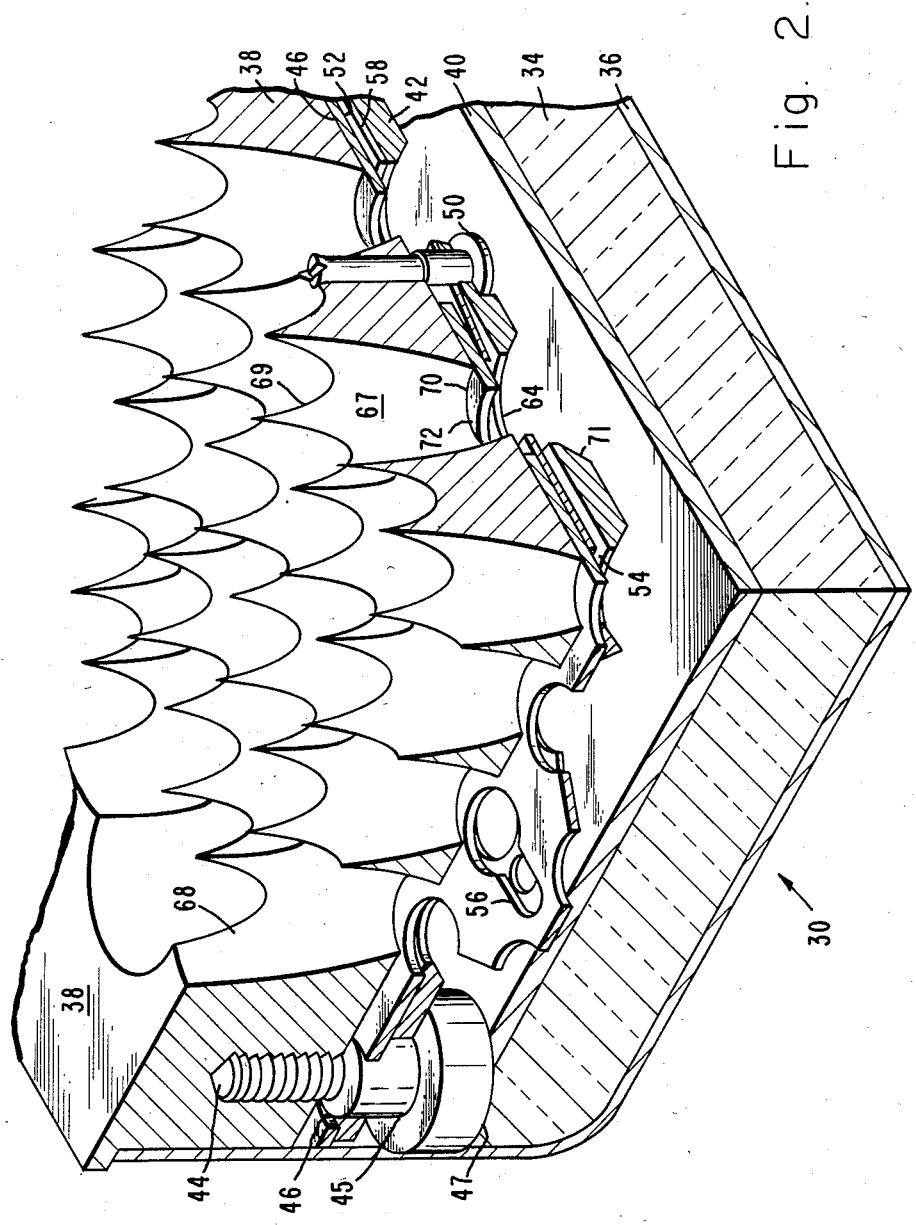

4,595,258

SHUTTER FOR RADIATION SOURCE OF EXTENDED AREA

TECHNICAL FIELD

This invention is directed to a shutter for producing a pulsed output from a radiant source. The purpose of this invention is to provide a means for interrupting the radiation from a blackbody source with a minimum reduction in its apparent area when in the "on" state. The shutter is particularly useful for producing pulsed emission from a beacon so that its position can be determined.

BACKGROUND OF THE INVENTION

The total radiant output of a blackbody source is proportional to the source area, the surface emissivity and the fourth power of its absolute temperature. Such radiant output can be used as a beacon. When a pulsed beacon is desirable, pulsing can be accomplished by turning off the radiant source. However, such does not produce sharp pulses and the achievable frequency is related to the thermal source and its thermal mass.

SUMMARY OF THE INVENTION

In order to aid in the understanding of this invention, it can be stated in essentially summary form that it is directed to a shuttered radiant beacon wherein an optical plate has openings therethrough and a shutter plate adjacent thereto. The shutter plate has similar openings, and can be moved from a position where the openings are aligned and the shutter is open to a position where the openings are nonaligned and the shutter is closed. The openings in the optical plate are divergent and adjoining to maximize the area and limit the angular distribution of the beam beyond the shutter.

It is thus a purpose and advantage of this invention to provide a shuttered beacon which is useful for modulating or pulsing the radiated signal from a radiant blackbody. It is a further object to provide a shuttered beacon which has openings therethrough divergent in the beam direction to minimize attenuation and to shape the radiation pattern from a surface radiator, to conserve energy and permit the interruption of the radiant output by a small displacement of a shutter plate placed between the radiant emitter and the openings. Other purposes and advantages of this invention will be apparent from a study of the following portion of the specification, the claims and the attached drawings.

BRIEF DESCRIPTION OF THE DRAWINGS

FIG. 2 is an enlarged isometric view with parts broken away, showing the radiation source with its shutter in accordance with this invention.

DESCRIPTION OF THE INVENTION

The total radiant output of a blackbody source, such as the pyrotechnic device 34 of beacon 30 shown in FIG. 2 is proportional to the source area, the surface emissivity and the forth power of the absolute temperature of the source. When a blackbody is used as a source for long wavelength radiation, this relationship must be modified to account for the shift in spectral distribution of the radiant energy in the desired bands. Increasing temperature causes a shift to shorter wavelength. Thus, the radiant output in a given wavelength band increases less than does the total output.

Figure 3:
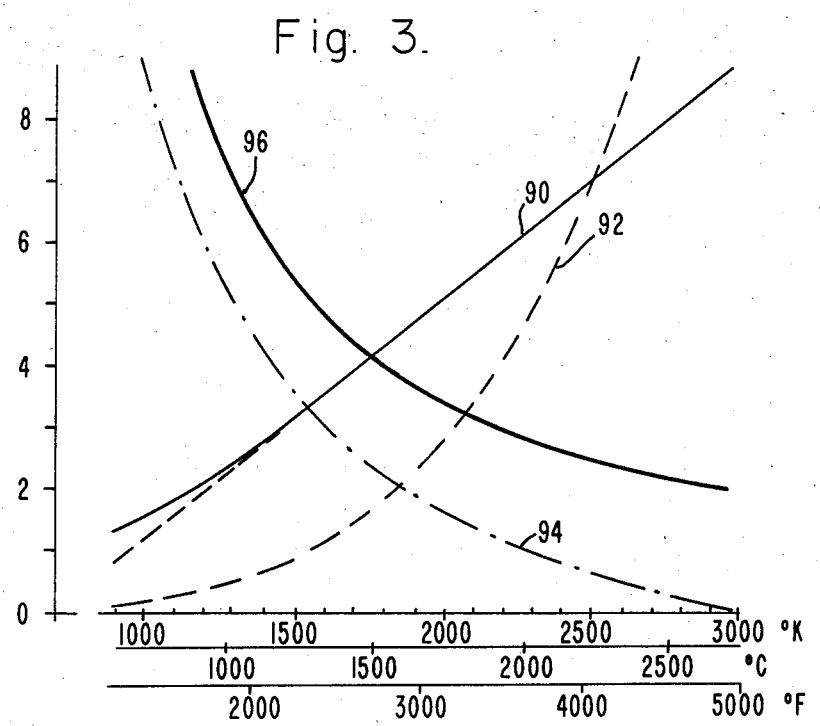
FIG. 3 is a graph of shutter operating parameters.

FIG. 3, at the line 90 shows that the useful radiance is almost linear with temperature for the structure of this invention. For this curve, the ordinate is the effective radiance in the 8 to 12 micrometer band in (watts-steradian$^{-1}$-centimeter$^{-2}$)×10. Curve 92 shows the total radiance of the source in (watts-steradian$^{-1}$-centimeter$^{-2}$)×10$^{-1}$, which varies as the fourth power of absolute temperature. Line 94 shows the percent of flux in the 8 to 12 micrometer band and shows the spectral efficiency drops with increasing temperature. Curve 90 is the product of curves 92 and 94. Curve 96 has as its ordinate the area in square inches for 10.8 watts per steradian output. The required area drops with the temperature increase. Curve 96 is the reciprocal of curve 90.

Figure 1:
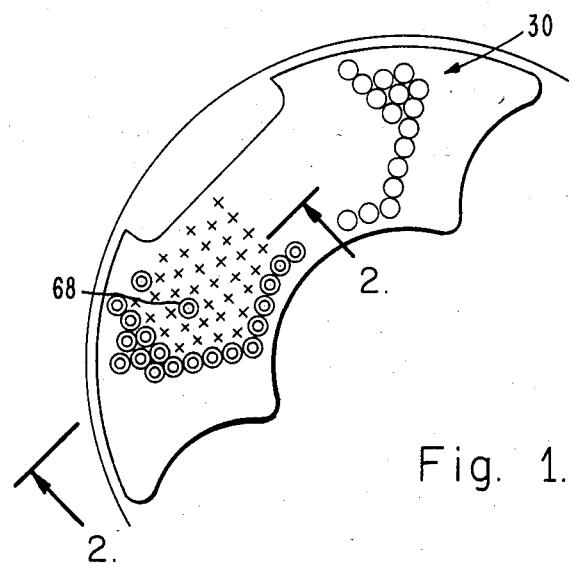
FIG. 1 is a rear view of the shutter for extended radiation source in accordance with this invention.

The useful radiant power varies as T minus 700 degrees Kelvin while the total radiated power varies as T$^4$ (see line 92). Because of this substantial difference it is desirable to operate at as low a temperature as possible. In addition to energy efficiency, minimizing source temperature reduces problems with materials. In order to maximize the total radiant output, the blackbody radiation source should be made as large as practical. In situations where the lateral area is limited by the size and/or shape of other structures, as in the case of the beacon 30 shown in FIG. 1, the source 30 takes an irregular shape in order to maximize its area. This irregular shape presents an additional constraint on the design of the shutter for interrupting the output radiation.

The beacon 30 achieves the goal of maintaining maximum source area by using adjoining divergent surfaces which present reflections of the underlying blackbody 34 when the shutter is open, thus maintaining the effect of a full area emitter.

Figure 4:
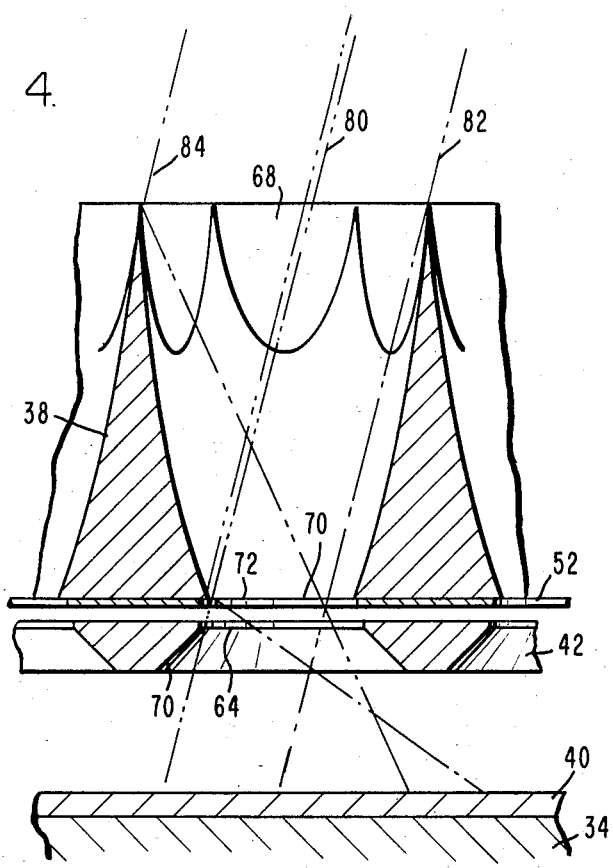
FIG. 4 is an enlarged section taken through one of the shutter openings and adjacent structure.

FIG. 2 is an isometric view of beacon 30 with parts broken away on planes through the shutter openings. FIG. 4 shows some of that structure in enlarged detail. Pyrotechnic device 34 preferably contains its own fuel and oxidizer and is exothermic when ignited. The pyrotechnic device 34 is contained in a forward housing 36 which extends rearwardly to embrace around outer plate 38 which serves as the main structural member of beacon 30. Housing 36 is closed by radiant source plate 40 which is heated by the pyrotechnic device 34 and radiates rearward, in the upward direction in FIG. 2, toward outer plate 38.

Inner optical plate 42 is mounted to the forward side of outer optical plate 38 by a plurality of screws, one of which is shown at 44 in FIG. 2. Shoulder 45 on screw 44 engages against the forward face 46 of the outer optical plate 38 which is the main structural member of beacon 30. Head 47 on screw 44 is thus spaced from forward face 46. The shouldered shank of screw 44 engages through an opening in the inner optical plate 42 and head 47 serves to constrain the inner optical plate and prevent it from moving farther away from outer optical plate 38. There are several screws 44 adjacent the edges of plate 38, and in order to constrain the center portion of inner optical plate 42, rivets such as rivet 50 are appropriately spaced across the area of inner optical plate 42.

Shutter 52 is a thin plate positioned against the forward surface 46 of outer optical plate 38. Shutter 52 has a slot adjacent all screws and rivets passing through the space 54 between the inner and outer optical plates. Such a slot is indicated at 56 with respect to rivet 50 in FIG. 2. At least three such screws or rivets are necessary to maintain the spacing and orientation of the optical plates. A slot is provided in the shutter 52 for all such screws and rivets, or they are positioned laterally of the periphery of shutter 52. The slots in shutter 52 around the screws and rivets are aligned in the same direction to permit sliding motion of the shutter plate preferably a distance slightly greater than the diameter of the radiating openings described below. In FIG. 2, shutter 52 is shown in an intermediate position between its left-most or closed and open positions. Spring 58 is a flat wave spring positioned in the space 54 between inner optical plate 42 and shutter 52. Due to the curved nature of wave spring 58 in the unstressed condition, the wave spring urges shutter 52 rearward to lie against the forward surface 46 of outer optical plate 38.

The purpose of the optical structure of outer optical plate 38, inner optical plate 42 and shutter 52 is to control the radiation emitted from heated body plate 40 in the rearward direction, upward in FIG. 2. When the shutter is in the open position, each of the elements at the rear of the beacon mechanism has an opening which is aligned with the openings in the other elements. A plurality of openings is provided, each being similar and spaced from each other, so only one such opening need be discussed.

In order to maximize the reflective surface seen from the rear, the cell openings 67 in the outer optical plate 38 are divergent in the direction of the radiant output and adjoin each other as hexagonal cells. One of the cell edges is shown at 69. This allows the perforated shutter plate 52 between the array of cells in outer optical plate 38 and the emitting source 40 to pass or block radiation by moving the shutter plate 52 by a distance equal to the diameter of the openings 72 in the shutter plate 52.

The reflective cells are all the same so that only the cell 68 need be described in detail. It is formed with mirrored walls to maximize radiation. The cell walls can be formed of any of a variety of shapes as determined by the use and the method of fabrication. A truncated hexagonal pyramid is one appropriate cell shape. A truncated right circular cone may be more easily fabricated. Such truncated cones are positioned so that the intersections form a hexagonal array. In addition, such a structure reduces multiple-reflection losses that occur in the corners of a hexagonal pyramid. A still more efficient shape is a truncated parabolic surface of revolution formed by a parabolic curve with the slope at the entrance and exit each chosen to provide a single reflection path to the source from any point in the angular field to be illuminated. This can be achieved for off-axis angles up to 20°. The lines 80, 82 and 84 in FIG. 4 indicate rays to an off-axis viewer. Throughout the intended field of view, the entire beacon area presents direct view or only single reflection of the source. The radiation source 40 is directly seen between lines 80 and 82 when the field of view is as far away from the line normal to the plane of the shutter as indicated in FIG. 4. The reflection of the source 40 is seen between lines 80 and 84, at the same angle. It must be noted that the lines 82 and 84 lie directly adjacent similar lines for adjacent view openings in the outer optical plate. Thus, the source is seen directly, or with a single reflection over the entire set of optical openings 68 in the outer optical plate within the angular limits at off-axis angles somewhat beyond that indicated by the lines 80, 82 and 84 in FIG. 4. In this way, the full area radiation is visible over a cone angle about the normal. The angle is a function of the size of the shutter depth of the outer optical plate 38 and the size of the reflective openings in the outer optical plate.

The openings in the outer optical plate 38 are aligned with openings 71 in inner optical plate 42. Inner optical plate 42 provides mechanical constraint and heat shielding for the shutter 52. The wave spring 58 with its matching perforations holds the shutter plate in intimate contact with the forward face 46 of the main structural member 38 which is the outer optical plate to cause sharp cut-off. With the shutter held in place, radiation leakage is minimized. Furthermore, holding the shutter in place constrains the rise in shutter temperature by maintaining a thermal path to the larger mass of the main plate 38. It is important that the shutter and inner optical elements be shaped to avoid interference with the paths of radiation reflected by the outer optical array cell walls. The hole diameter and the shape of the divergent openings 68 achieve this purpose.

To avoid excessive heating, all elements of the shutter have reflective, low absorptivity surfaces. Only the outer optical array surfaces are required to act as specular reflectors. The outer face of the shutter 52 must have low emissivity as it becomes the radiation source when the shutter is closed.

The parabolic surface 68 intersects with forward surface 46 to define a circular opening 70, which is preferably of slightly smaller diameter than the small end opening 64 of the truncated right circular cone 71 in inner optical plate 42. The openings 64 and 70 are in alignment. Opening 70 is the same size as or smaller than opening 72 in shutter 52. The shutter opening 72 is in alignment with circular opening 70 when the shutter 52 is in the open position as illustrated in FIG. 4. Beacon 30 is turned on and off by moving shutter 52 between the positions where the openings are in alignment and out of alignment. The direction of this shutter motion is controlled by the slots around the screws and rivets, for example, slot 56. The spacing between the openings 68 is such that the shutter 52 can be moved in the direction of the rightside section plane in FIG. 4 and all of the openings will be completely closed or obscured by the blank space in the shutter 52 between the openings 72 in the shutter plate. Of course, when the openings are aligned, radiation from plate 40 is seen from the rear, and when the shutter plate 52 is in the closed position, that radiation is obscured. Thus, motion of the shutter causes pulsing of the signal as seen from the rear.

The shutter can be operated by any desired actuator. An electromagnetic, pneumatic or hydraulic actuator can be selected for this operation. Because the required shutter motion is short even for a large area source, shutter actuation time can be on the order of a few milliseconds. Additionally, the shutter plate can be relatively thin to minimize the mass driven by the actuator.

The extended source shutter of this invention can be used for chopping or modulation of various sources in the laboratory or in communication. Furthermore, in some applications it would be useful as an optical countermeasure source, and as an infrared signature simulator. In addition to the basic advantage of minimizing overall dimensions for a given output, the cellular nature of this shutter permits the shape and spatial variation of intensity of a laterally extended source to be substantially retained when viewed through the shutter.

For continuous operation, the outer optical array structure 38 can be built with internal passages for the circulation of coolant fluid so as to maintain shutter temperature sufficiently low to preserve the shutter and maintain a low radiant output in the off state.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A shutter for selectively passing and blanking the radiant energy from an extended area source radiating energy in a first direction, said shutter being positioned adjacent said source in the first direction, said shutter comprising:

an outer optical plate having a forward and a rearward surface and having a plurality of openings therethrough, each of said openings being a portion of a parabolic surface of revolution diverging in said first direction and spaced sufficiently close to one another such that the walls of adjacent openings intersect each other between the forward and rearward surfaces of said outer optical plate and such that the intersections form a hexagonal pattern and the rearward aperture of said openings is comprised of a set of six arcuate edges, and the rearward surface of said outer optical element opposite said openings is comprised of a plurality of substantially point sized areas; and a shutter plate positioned between said outer optical plate and said source, said shutter plate having a plurality of openings therethrough, said shutter plate being movably mounted so that in a first position of said shutter plate with respect to said outer optical plate said holes in said shutter plate and in said outer optical plate are in substantial alignment and in a second position of said shutter plate with respect to said outer optical plate, said holes are out of alignment to substantially blank transmission of radiation from said source through said shutter.

* * * * *